(12) United States Patent
Anurag et al.

(10) Patent No.: US 12,526,010 B2
(45) Date of Patent: Jan. 13, 2026

(54) TEST MONITOR INCLUDING SIGNAL SEPARATOR AND DATA RECORDER

(71) Applicant: Tektronix, Inc., Beaverton, OR (US)

(72) Inventors: K T Anurag, Bangalore (IN); Darshan Mehta, Bangalore (IN); P E Ramesh, Bangalore (IN)

(73) Assignee: Tektronix, Inc., Beaverton, OR (US)

( * ) Notice: Subject to any disclaimer, the term of this patent is extended or adjusted under 35 U.S.C. 154(b) by 825 days.

(21) Appl. No.: 17/714,842

(22) Filed: Apr. 6, 2022

(65) Prior Publication Data

US 2022/0329332 A1      Oct. 13, 2022

(30) Foreign Application Priority Data

Apr. 7, 2021   (IN) .............................. 202121016402

(51) Int. Cl.
    *H04B 3/50*        (2006.01)
(52) U.S. Cl.
    CPC ..................................... *H04B 3/50* (2013.01)
(58) Field of Classification Search
    CPC .................................. H04B 3/50; H04B 3/46
    See application file for complete search history.

(56) References Cited

U.S. PATENT DOCUMENTS

| 7,394,282 | B2 * | 7/2008 | Sinha ............. H03K 19/018557 326/21 |
| 2020/0209290 | A1 * | 7/2020 | Ramesh .............. H04L 43/0847 |
| 2021/0240569 | A1 * | 8/2021 | Chopra ............... G06F 11/1461 |

* cited by examiner

*Primary Examiner* — Manuel A Rivera Vargas
(74) *Attorney, Agent, or Firm* — Miller Nash LLP; Andrew J. Harrington

(57) ABSTRACT

A test monitor extracts waveforms from a differential transmission line of an automobile network without disrupting the differential transmission line, and stores the data decoded from the extracted waveforms. The test monitor includes a first input configured to receive a voltage waveform from a voltage probe electrically coupled to the differential transmission line that electrically connects a first ECU device and a second device, a second input configured to receive a current waveform from a current probe electrically coupled to the differential transmission line, and one or more processors configured to receive the voltage waveform and the current waveform and determine a voltage of the first ECU device and a voltage of the second device based on the voltage waveform and the current waveform. The test monitor may be embodied in an FPGA. The test monitor enables monitoring of message transfers across a network in a non-intrusive and non-invasive manner, without the necessity of using a repeater or switch.

14 Claims, 10 Drawing Sheets

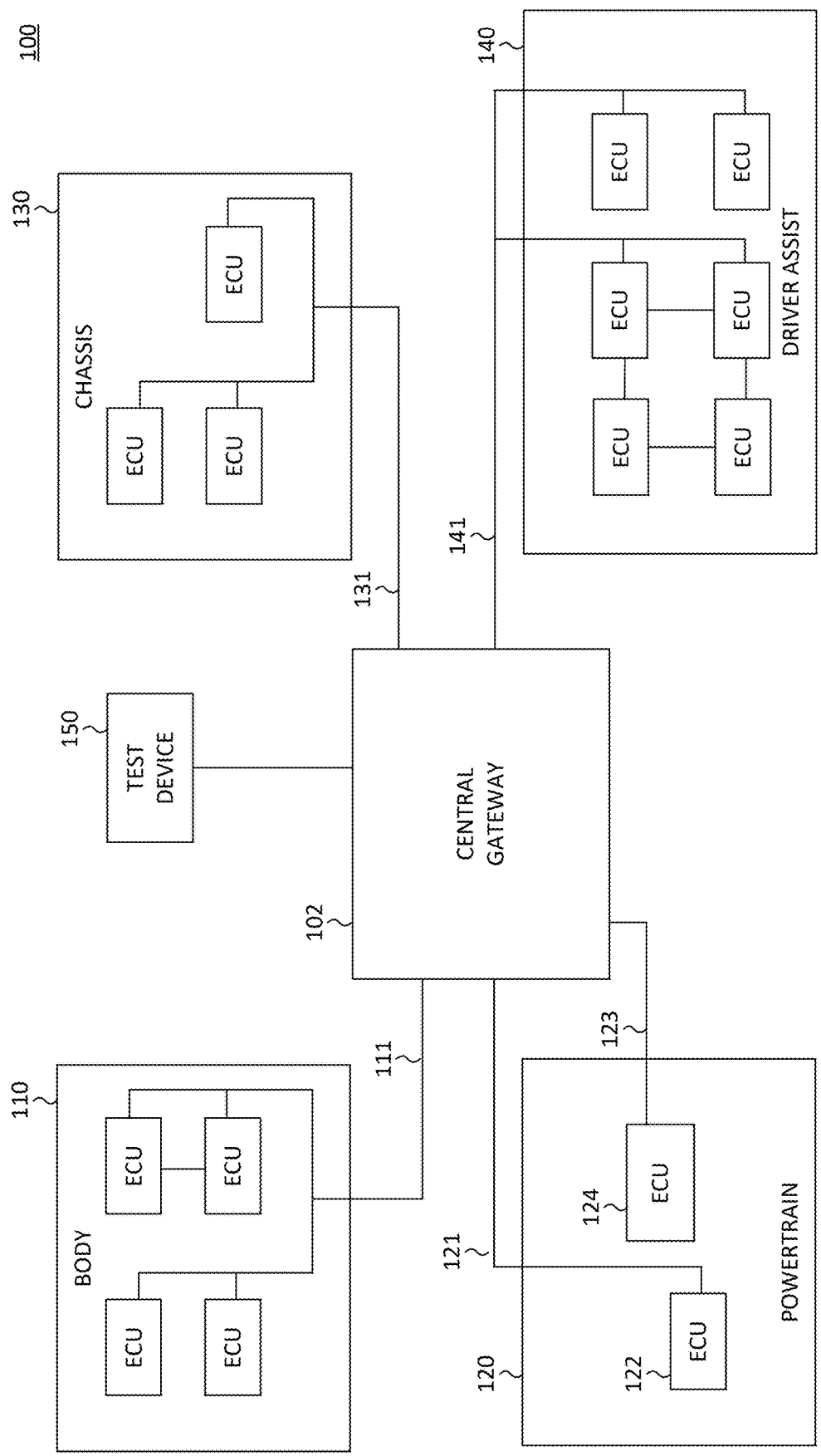
Fig. 1
(Conventional)

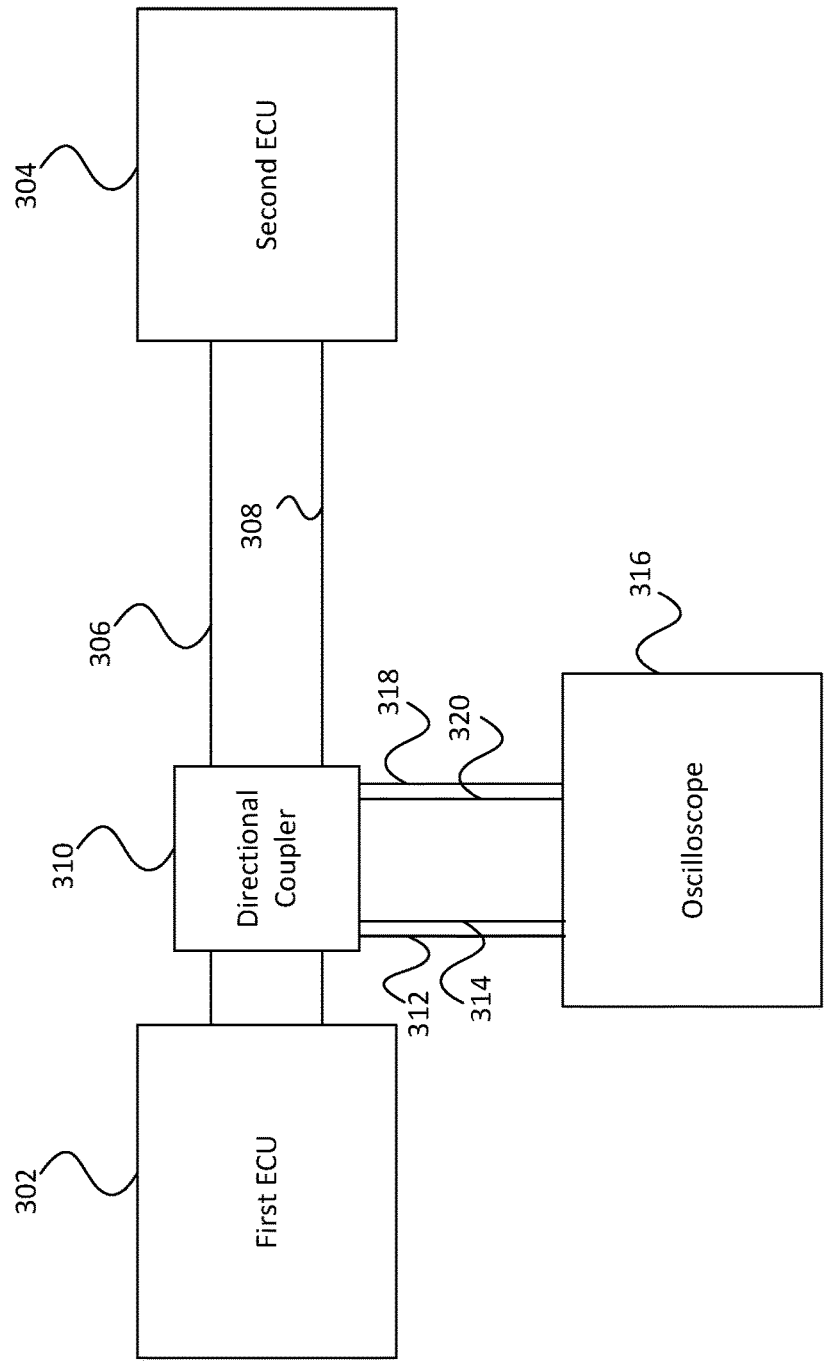
Fig. 3
(Conventional)

TEST MONITOR INCLUDING SIGNAL SEPARATOR AND DATA RECORDER

PRIORITY

This disclosure claims priority from Indian Provisional patent application Serial No. 202121016402 filed Apr. 7, 2021 and titled DATA LOGGER USING INBUILT SIGNAL SEPARATION, which is incorporated by reference herein.

FIELD OF THE INVENTION

This disclosure is directed to systems and methods related to test and measurement systems, and in particular, to methods and devices for logging and analyzing data carried on a full duplex serial communication signal without disrupting the communication links.

BACKGROUND

Full communication duplex links between two devices are employed in a wide variety of communication systems. Although signals sent across the communication duplex links are analog, the waveform level conveys digital logic level information. When communicating using a full communication duplex link, such as a 100 Base T1, 1000 Base T1, etc. each device exchanges information with the other device using training patterns that can allow link parameters to be adjusted by the devices to receive information without error.

In operation, it can be important to test the signal levels on the line, such as to ensure a low bit error rate and that no redundancy is involved because it is important that no information is misinterpreted and lost.

If only one device is sending information, an oscilloscope or other test device can monitor the signals and information may be decoded and physical layer signal integrity can be analyzed. However, in communication duplex links, both devices are sending information and the waveforms are added together as a combined waveform. Unless the testing system has prior knowledge from at least one of the sending devices, an oscilloscope is not able to decode the information from the acquired signal without utilizing a signal separation device, which can interject noise into the signals.

Modern cars include complex duplex data communication networks that couple multiple, separate, and sometimes disparate domains to one another. Example domains include multiple electronic control units (ECUs), powertrain, braking, driver assist systems, air conditioning, entertainment, etc. Present day cars may include over 80 such ECUs. Newer, autonomous-driving cars especially generate large amounts of data from the increased presence of sensors for steering, braking, pedestrian observation, navigation, etc. As cars have become more reliant on interconnected data generating devices, these car networks carrying such data are becoming more complex to accommodate the increased data sharing amongst the various domains. This is especially true in cases where legacy car networks are combined with new car Ethernet networks to provide backwards compatibility while also providing the higher speeds and capacity of modern car Ethernet networks.

Particular challenges in developing ECUs and their networks include difficulty in testing qualities such as link quality startup times, communication ready statuses, and harness fault detection, among others. Once installed, these ECUs and related sensors need to be tested and calibrated to ensure adequate operational boundaries. Component integrators need to develop diagnostic routines to ensure correct startup and operation, all of which relies on testing networks without interfering or degrading the signals carried on the networks.

Presently, there are no testing systems that provide data logging and analysis features from disparate domains without negatively altering the data carried on the networks, due to the difficulties described above.

Embodiments of the disclosure address these and other deficiencies of the prior art.

BRIEF DESCRIPTION OF THE DRAWINGS

Aspects, features and advantages of embodiments of the present disclosure will become apparent from the following description of embodiments in reference to the appended drawings in which:

FIG. 1 is a block diagram illustrating conventional car networks.

FIG. 3 is an example of a conventional test and measurement system for measuring a signal from a first ECU device connected to another ECU device via a communication link.

DESCRIPTION

Figure 2:
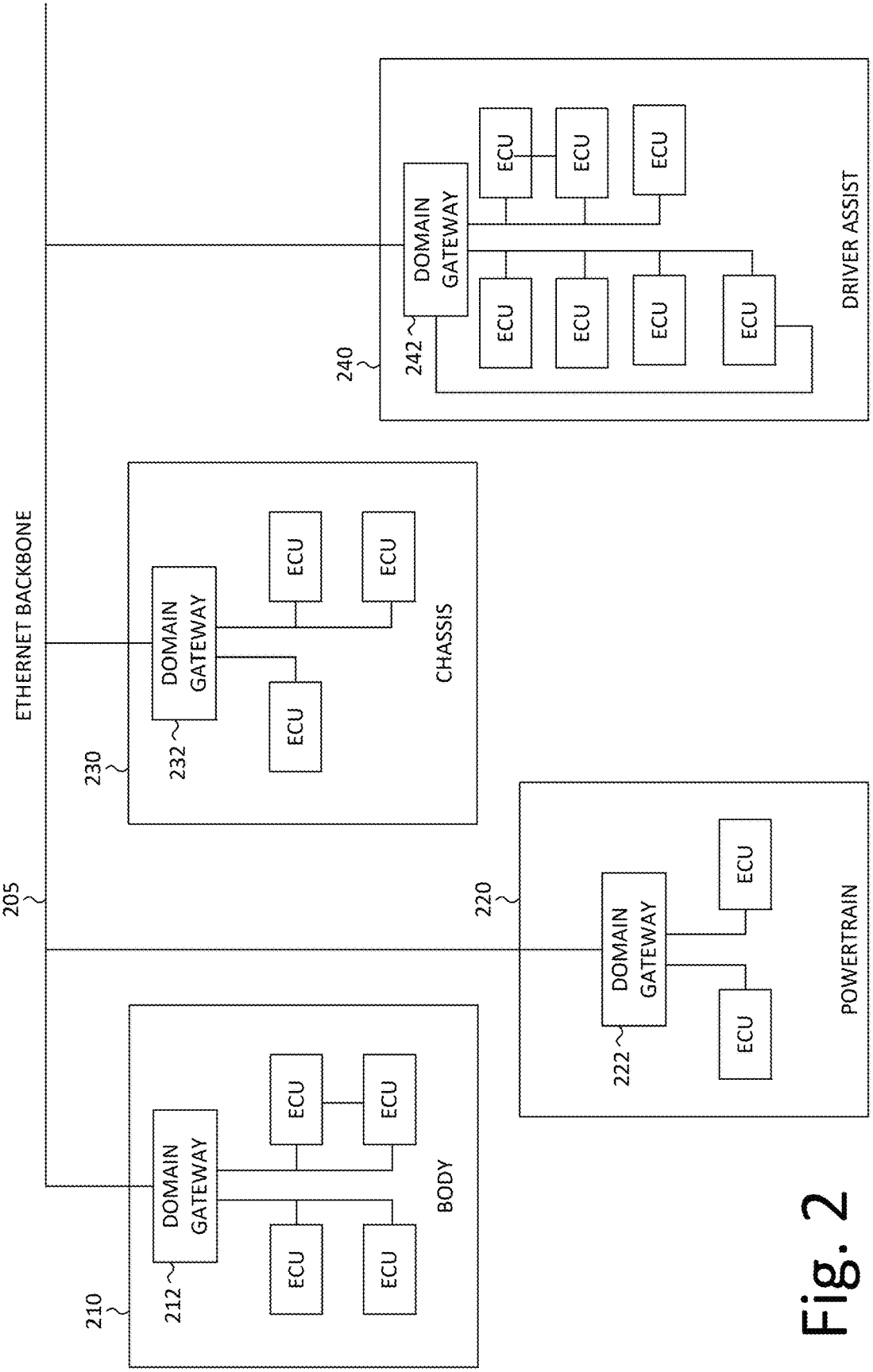
FIG. 2 is a block diagram illustrating present and future networks upon which embodiments of the invention may operate.

Car data networks may take various forms. Legacy networks typically include CAN (Controller Area Networks), which use message based protocols over a two-wire bus to communicate between one or more Electronic Control Units (ECUs). FIG. 1 illustrates an example CAN 100 including a central gateway 102 and four domains. Domains in the CAN 100 of FIG. 1 include a body domain 110, a powertrain domain 120, a chassis domain 130, and a driver assist domain 140. As mentioned above, modern cars may include 80 ECUs or more, typically broken up into multiple domains, and FIG. 1 shows only four domains for ease of illustration, although modern CANs typically include many more domains than those represented. The central gateway 102 is optional. Older CANs did not have gateways, and instead all ECUs were connected to a single network. If present, the gateway may manage more than five different types of interfaces to communicate to ECUs in the respective domains. Although the central gateway 102 may be present, or not, in some embodiments the CAN 100 also operates as a single network, i.e., all of the ECUs are coupled to one another, so each ECU was able to communicate with all of the other ECUs. ECUs may be coupled to one another in a variety of different methods, including direct point-to-point, small ring networks, cascade networks, and others. Because all of the traffic on the CAN 100 is sent to all ECUs on the network, it is relatively easy to read, or sniff, data traffic on the network by merely connecting a test device 150 to one of the communication lines 131 on the bus. Or, if present, the test device 150 may connect to the central gateway 102 to observe the data signals being sent over the CAN 100. Older car networks included one or more LINs (Local Interconnect Networks), which were typically single-line communication networks that connected ECUs to one another. Similar to testing the CAN 100 described above, it was relatively easy to connect a test device to LINs to observe traffic on the LIN, as all traffic on a LIN was also sent to all ECU nodes.

FIG. 2 is a block diagram illustrating a more modern car network, where one or more domains 210, 220, 230, 240 are coupled to a high-speed Ethernet backbone 205. Typically, each of the domains 210, 220, 230, 240 includes a respective gateway 212, 222, 232, 242, which routes traffic between the respective domain and the Ethernet backbone 205. It is not as easy to monitor traffic on the Ethernet backbone 205 as it is monitoring the CAN 100 network of FIG. 1, because monitoring the Ethernet backbone 205 is only possible through a switched network, and adding a testing device through a switch as another node on the Ethernet backbone 205. Adding another node to an Ethernet backbone 205 affects the network operation itself, as messages sent to a destination address on the switch network would not be also sent to the testing node. Instead, to insert a testing node on an Ethernet switched network 205 would require the network logic to be modified to make a copy of the network traffic, effectively mirroring, or doubling the traffic on the network, which is not desirable.

To monitor Ethernet traffic on a network, a system as illustrated in FIG. 3 would normally be used. FIG. 3 illustrates a conventional system 300 for separating the duplex signal between the two ECU devices 302 and 304. A differential transmission line, such an Ethernet communication line, includes two lines 306 and 308 to send and receive signals between the ECU devices 302 and 304.

In this conventional system, a directional coupler 310 is inserted into the transmission line between the two ECUs 302 and 304, as well as by interrupting the transmission lines 306 and 308. The directional coupler 310 can be physically large and there are times when there is not enough space provided between the first ECU 302 and the second ECU 304 to use the directional coupler 310.

The directional coupler 310 can output transmitter signals 312 and 314 to a test and measurement instrument 316, such as an oscilloscope, and receiver signals 318 and 320 to the test and measurement instrument 316 for further analysis. However, the signals produced by the directional coupler 310 are approximately 12 to 20 decibels attenuated, depending on the directional coupler, which can make it difficult to measure the signals accurately with a good signal to noise ratio (SNR). Further, inserting the directional coupler 310 on the transmission line 306 and 308 can introduce some undesirable effects to the communication signals, such as introducing latency between sending and receiving messages. Minimizing latency is especially important in automobile networks, as timely delivery of messages is critical to proper operation of the automobile, such as with braking and steering subsystems. And if there are any characteristic differences, such as length, parasitic reactance, etc., between the transmission lines 306 and 308 probing points (that is, the location of the directional coupler 310) from the transmission side and from the receiver side, the receiver signal may not be separated accurately even if the transmission signal is separated properly, or vice versa. Another disadvantage of the conventional system illustrated in FIG. 3 is that the presence of the directional coupler 310 adds another device, which repeats network traffic, and thus this system alters the operation of the original network, including the signals carried on the transmission lines 306 and 308.

As will be discussed in more detail below, embodiments of the disclosure allow for separating the duplex signal without the use of a directional coupler, such as the coupler 310 of FIG. 3. Rather, as will be described in detail, voltage and current probes can be used and the test and measurement instrument can separate the signals based on the information received through the probes. Further, the voltage and current probes may be integrated into a decoder and data logger device, to provide a convenient full solution to the problem of analyzing traffic on a network without affecting the signals on the underlying network, and without the necessity of using a directional coupler 310.

Figure 4:
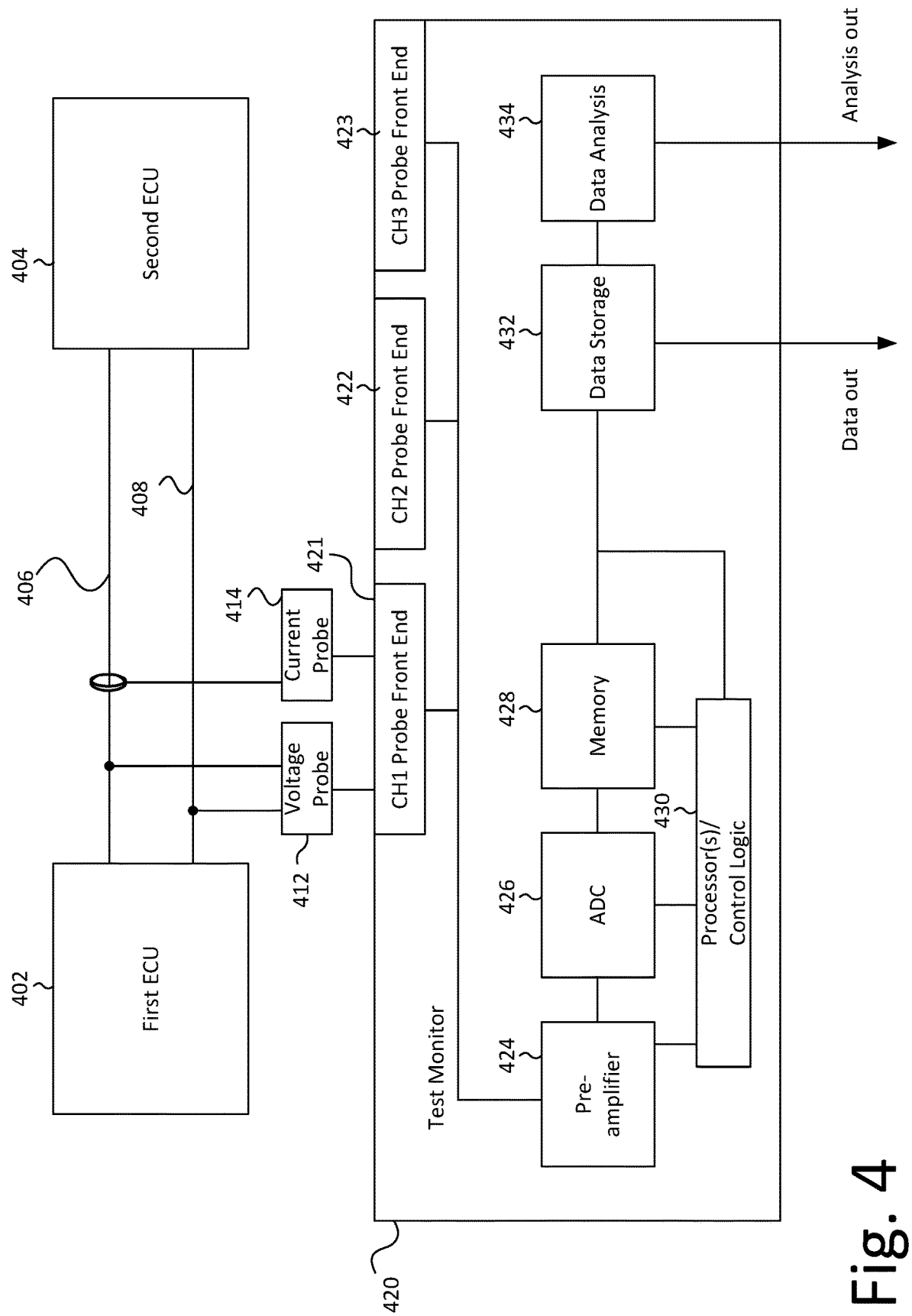
FIG. 4 is an example of a test and measurement system for extracting signals from an automobile network without affecting the network, and decoding data, according to some embodiments of the disclosure.

FIG. 4 illustrates an example test and measurement system according to some embodiments of the disclosure. Similar to FIG. 3, the test and measurement system includes a first ECU device 402 and a second device 404. The first device 402 and the second device 404 communicate on a common differential transmission line for communicating a full duplex differential signal. The common differential transmission line may be, for example, a full duplex serial communication link such as, but not limited to, 100 Base T1, 1000 Base T1, etc. This type of line is often used, for example, in automotive Ethernet, which uses full-duplex signaling over a single twisted pair of wires, or co-axial wires, which may operate at a multi-level modulation scheme, such as two or more levels. Although embodiments of the invention are described using an automobile network, other embodiments are operable on any type of data network, such as industrial networks.

The common differential transmission line includes a first line 406 and a second line 408. Each of the voltage and current waveforms on the transmission line appear as superimposed waveforms. That is, a signal is sent concurrent from the first ECU 402 and the second ECU 404. Looking at it from the view point of the first ECU 402, the output of the first ECU 402 is a transmission signal and the output from the second ECU 404 is the receiver signal. For ease of discussion, the output of the first ECU 402 will be characterized as the transmission signal, or Tx signal, and the output of the second ECU 404 will be characterized as the receiver signal, or Rx signal. However, as will be understood by one skilled in the art, both the first ECU 402 and the second ECU 404 are concurrently sending and receiving signals on the differential signal lines.

Figure 5:
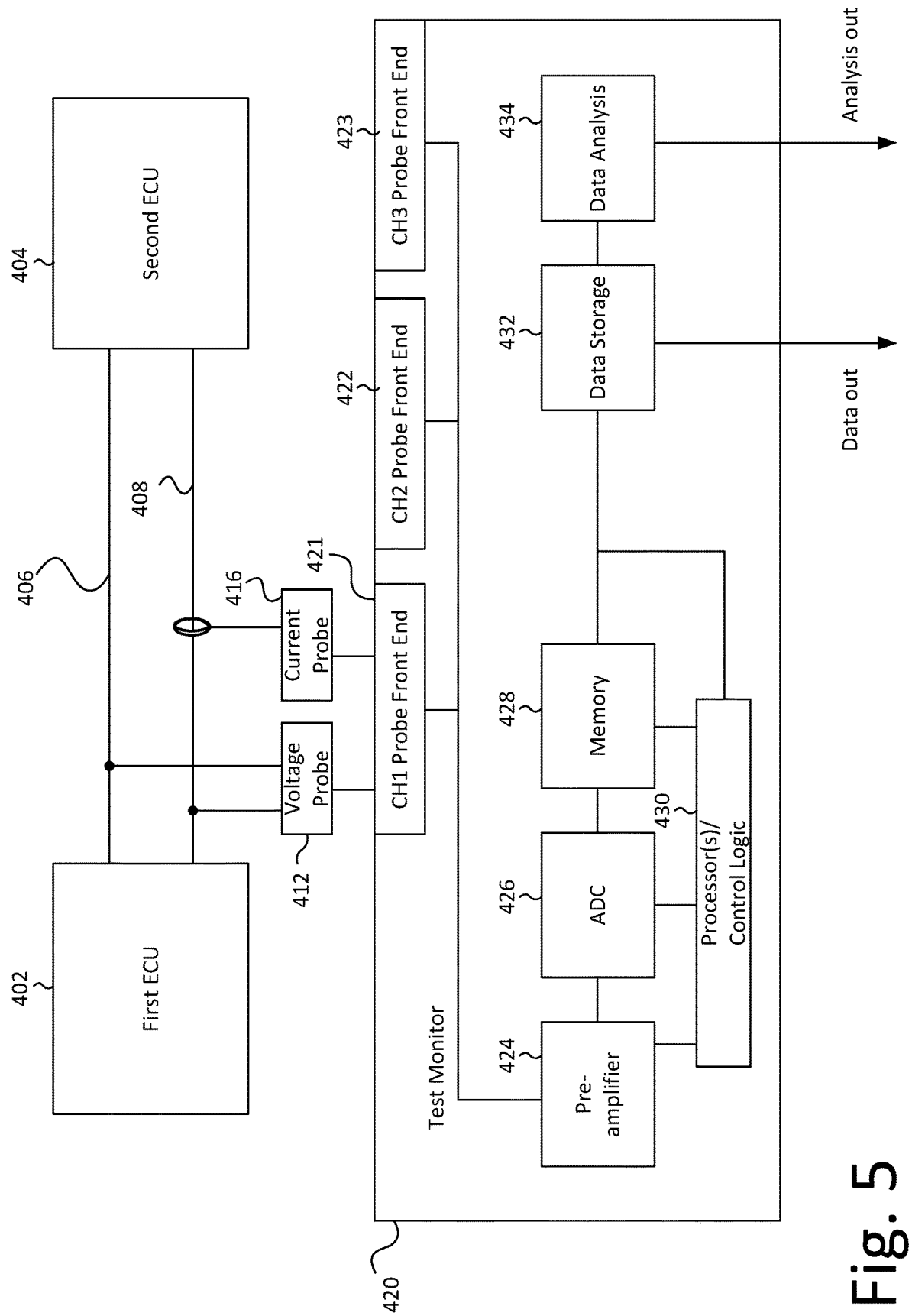
FIG. 5 is another example of a test and measurement system for extracting signals from an automobile network without affecting the network, and decoding data, according to some embodiments of the disclosure.

In the system of FIG. 4, a differential voltage probe 412 is connected to differential signal lines 406 and 408. A current probe 414 is coupled to one of the differential signal lines, preferably close to a positive end of the voltage probe. In FIG. 4, the current probe 414 is coupled to transmission line 406, which is connected to the positive probe of voltage probe 412. In FIG. 5, the current probe 416 is coupled to transmission line 408, as the polarities of the lines for voltage probe 412 are reversed.

The output of the current probe 414 and the voltage probe 412 are sent to a test monitor 420, which may also include data logging and data analysis features, as described below. In a conventional test device, the signals obtained from probing the transmission lines 406 and 408 are displayed as superimposed signals. However, embodiments of the disclosure include a test monitor 420 that has one or more processors 430 and/or other hardware that can separate the transmission and receiver signals. The voltage probe 412 and current probe 414, 416 may be coupled to the differential signal lines through a standard or non-standard, separable electrical connector, which allows the test monitor 420 to be easily connected or disconnected from the network. Further, the differential signal lines may be embodied by twisted pair lines or coaxial lines, or others, depending on the implementation.

For ease of discussion, the signal from the first ECU 402 will be referred to as Tx and the signal from the second ECU 404 will be referred to as Rx. Depending on the particular network, each of the signals Tx and Rx may have a high level of a maximum of 1V and a low level of a maximum of −1V. However, the levels of the Tx and Rx signals is based on the number of modulation levels of the network. The differential transmission lines can have a differential termination impedance, referred to as Z. This value may be set based on the actual differential termination impedance of the differential transmission line used. For examples below, Z will be set to 100 Ohms in this example. However, as will be understood by one skilled in the art, this value can be set by a user in the test monitor 420 based on the actual differential termination impedance of the differential termination line used.

When both the Tx and Rx signals are high, then the measured voltage by the voltage probe 412 at that point will be approximately 2V. At that moment, the current of the Tx signal flows from the first ECU 402 to the second ECU 404, while the current of the Rx signal flows from the second ECU 404 to the first ECU 402. Since the direction of the Tx and Rx currents are the reverse of each other, the superimposed current measured by the current probe 414 is zero amperes.

When both the Tx and Rx signals are low, the voltage probe 412 will read a voltage of −2V, meanwhile the current is still 0 amperes since the currents are still reverse of each other. However, when the Tx signal is high and the Rx signal is low, the superimposed voltage measured by the voltage probe 412 is 0V, and the superimposed current is 20 mA in this example, as the current flows from the Tx node to the Rx node, which is illustrated in equation (1):

$$(1V/100\Omega)-(-1V/100\Omega)=20\ mA \qquad (1)$$

When instead the Tx signal is low and the Rx signal is high, the superimposed voltage measured by the voltage probe 412 is again 0V, and the superimposed current is −20 mA, as the current flows from the Rx node to the Tx node. For purposes of discussion, current flowing from the first ECU 402 to the second ECU 404 is defined as a positive current.

The probed voltage waveform by the voltage probe 412 is referred to as superimposed voltage waveform $V_{TxRx}$ and the current waveform probed by the current probe 414 will be referred to as superimposed current waveform $I_{TxRx}$, and the differential termination impedance will be referred to as Z. The Tx signal voltage will be referred to as $V_{Tx}$ and the current will be referred to as $I_{Tx}$. The Rx signal voltage will be referred to as $V_{Rx}$ and the current will be referred to as $I_{Rx}$.

To extract the Tx voltage signal from the superimposed voltage waveform $V_{TxRx}$, the Rx voltage waveform $V_{Rx}$ has to be subtracted from the superimposed voltage waveform $V_{TxRx}$. However, the Rx voltage waveform $V_{Rx}$ cannot be obtained directly by probing because, as mentioned above, the Tx and Rx signals are superimposed on the transmission lines 406 and 408.

However, a multiplication of the probed current $I_{TxRx}$ and the impedance Z is equal to $V_{Tx}$ less $V_{Rx}$. Therefore, adding the superimposed current waveform $I_{TxRx}$ multiplied by Z to the superimposed voltage waveform $V_{TxRx}$ results in:

$$V_{TxRx}+I_{TxRx}*Z=(V_{Tx}+V_{Rx})+(V_{Tx}-V_{Rx})=2V_{Tx} \qquad (2)$$

Then, $V_{Tx}$ is equal to:

$$V_{Tx}=(V_{TxRx}+I_{TxRx}*Z)\div 2 \qquad (3)$$

For $V_{Rx}$, subtracting the superimposed current waveform $I_{TxRx}$ multiplied by Z from the superimposed voltage waveform $V_{TxRx}$, results in:

$$V_{TxRx}-I_{TxRx}*Z=(V_{Tx}+V_{Rx})-(V_{Tx}-V_{Rx})=2V_{Rx} \qquad (4)$$

Then, $V_{Rx}$ is equal to:

$$V_{Rx}=(V_{TxRx}-I_{TxRx}*Z)\div 2 \qquad (5)$$

Using these equations, in one embodiment of the disclosure, the one or more processors 430 of the test monitor 420 can receive the superimposed voltage waveform $V_{TxRx}$ from the voltage probe 412 at a first input and can receive the superimposed current waveform $I_{TxRx}$ from the current probe 414 at a second input. In FIG. 4, each of the first and second inputs are illustrated as a CH1 probe front end 421. Other front ends, specifically CH2 probe front end 422 and CH3 probe front end 423 may be used by the test monitor 420 to receive signals coupled to voltage and current probes on other channels, as described below. For FIG. 4, however, the test monitor 420 is only coupled to a single channel, which is CH1. The test monitor 420 may include any number of front ends, and can monitor any number of channels simultaneously.

Using the differential termination impedance Z, which may be set through a user input or stored in the test monitor 420, the one or more processors 430 can separate the Tx signal voltage waveform $V_{Tx}$ and the Rx signal voltage waveform $V_{Rx}$ from the superimposed voltage waveform $V_{TxRx}$.

When there is a difference between the distance along the transmission line from the first ECU 402 to the probing point and from the second ECU 404 to the probing point, e.g., the probing point may be closer to the first ECU 402, and if there is parasitic reactance over the transmission lines 406 and 408 from the second ECU 404 to the probing point (such as due to connectors and the longer transmission line), there may be a phase difference between the voltage waveform and the current waveform from the second ECU 404, even if there is no phase difference between the voltage waveform and the current waveform from the first ECU 402.

For example, parasitic inductance of connectors can cause current phase delays. As a result of this, the Rx voltage waveform $V_{Rx}$ determined from equation (5) may not be accurate. In such a situation, the one or more processors 430 can use digital signal processing to correct the phase difference due to parasitic reactance, and the phase-corrected Rx waveform may be used for the above waveform arithmetic processing, which will allow for extracting the Rx signal more accurately.

That is, using the embodiment described above, the Tx signal may be extracted using the measured superimposed current waveform $I_{TxRx}$ and superimposed voltage waveform $V_{TxRx}$, while the Rx signal is extracted using the measured superimposed voltage waveform $V_{TxRx}$ and a delay-corrected current waveform $I_{TxRx}$.

In some embodiments, referring to FIG. 5, a current probe 416 may be coupled to both transmission lines 406 and 408 to determine the current on both lines 406 and 408. The differential current waveform obtained by the current probe 416 can eliminate common-mode current noise. In some embodiments, the current probe 416 may be two distinct current probes, with one probe coupled to line 406 and the other current probe coupled to the line 408.

If the current probe 416 is coupled to both lines 406 and 408, the measured superimposed current $I_{TxRx}$ will have double the amplitude. To account for this, equations (3) and (5) above can be modified as follows:

$$V_{Tx}=(V_{TxRx}-I_{TxRx}*Z\div 2)\div 2 \quad (6)$$

$$V_{Rx}=(V_{TxRx}-I_{TxRx}*Z\div 2)\div 2 \quad (7)$$

Figure 6:
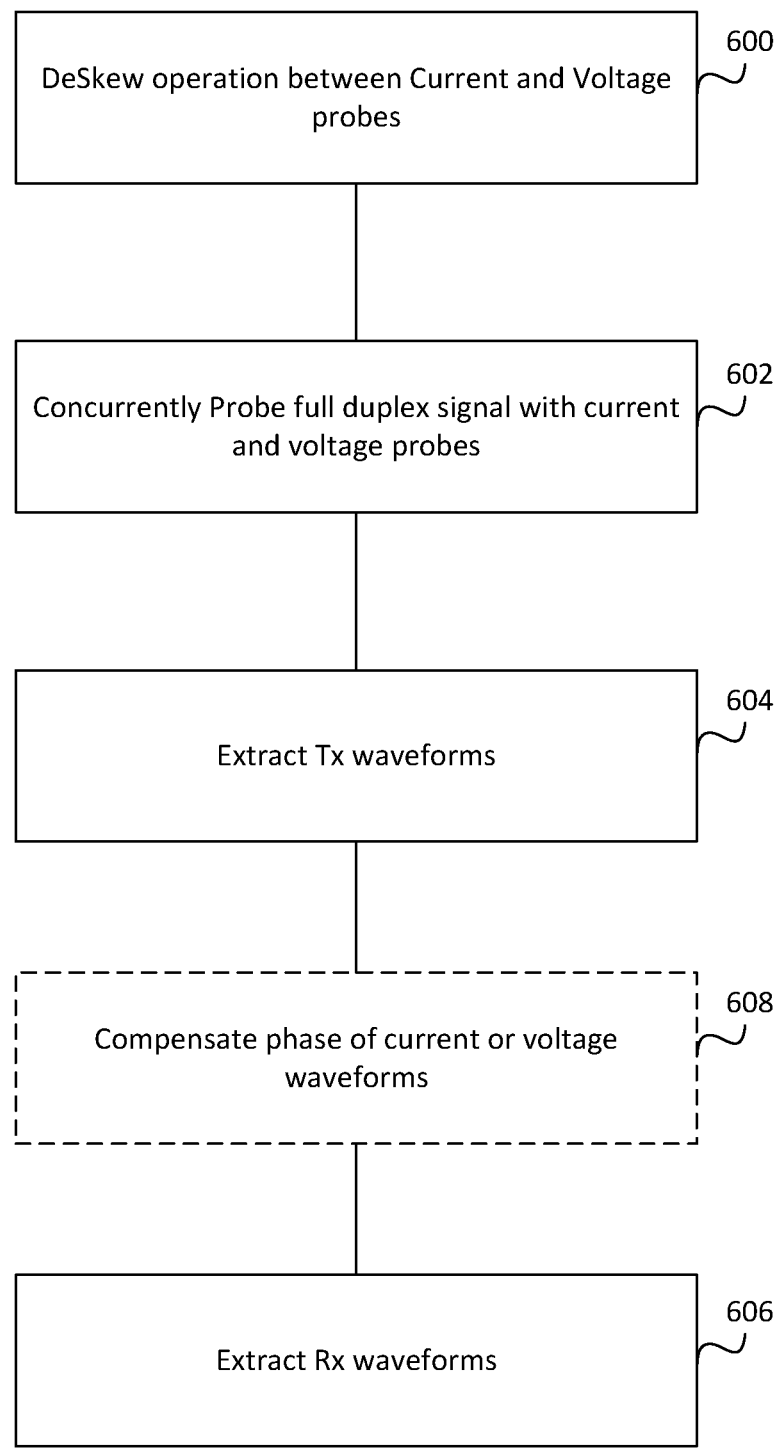
FIG. 6 is a flowchart illustrating example operations for extracting signals from the devices without disrupting the communication link according to some embodiments of the disclosure.

FIG. 6 illustrates an example operation for separating the superimposed waveform $V_{TxRx}$ according to some embodiments. Initially, in operation 600, a deskew operation can be performed between the current probes and the voltage probes to allow for phase calibration between current and voltage measurement systems of the test monitor 420.

Once the current and voltage probes have been calibrated, then in operation 602, the full duplex communication signal is concurrently probed with current and voltage probes to acquire the superimposed current waveform $I_{TxRx}$ and the superimposed voltage waveform $V_{TxRx}$ at the test monitor 420.

In some embodiments, an adaptive filter is used to match the voltage probe and the current probe. This can allow for correct signal separation, and the adaptive filter may be adapted based on the model of the currently used voltage probe and current probe.

The test monitor then, in operation 604, extracts the Tx waveform based on the superimposed current waveform $I_{TxRx}$ and the superimposed voltage waveform $V_{TxRx}$, as discussed above. For example, the test monitor 420 may use one of equations (3) or (6) discussed above to determine the Tx waveforms. The test monitor 420 may do this by utilizing the one or more processors 430 or using other hardware located in the test monitor 420.

In operation 606, the test monitor 420, through the one or more processors 430 and/or other hardware, can then extract the Rx waveforms using one of equation (4) or (7) discussed above.

The extracted Tx and Rx waveforms may be saved in a memory, displayed to a user on a display, or may be further analyzed, such as for signal integrity and/or decode analysis.

In some embodiments, an optional operation 608 may be performed before extracting the Rx waveform in operation 606. In operation 608, the test monitor, through either the one or more processors 430 and/or other hardware, may compensate the phase of the superimposed current waveform $I_{TxRx}$, as discussed above. That is, the phase of the superimposed current waveform $I_{TxRx}$ can be compensated based on the parasitic reactance over the transmission line from the second ECU 404 to the probing point. In alternative embodiments, rather than compensating the superimposed current waveform $I_{TxRx}$, the superimposed voltage waveform $V_{TxRx}$ may instead be compensated based on the parasitic reactance of the transmission line.

Further, the extraction of the Tx and the Rx waveforms does not need to be performed linearly, as shown in FIG. 6 for ease of discussion. Rather, the Tx and Rx waveforms may be extracted in parallel for faster processing time, or the Rx waveform may be extracted prior to the Tx waveform.

Figure 7:
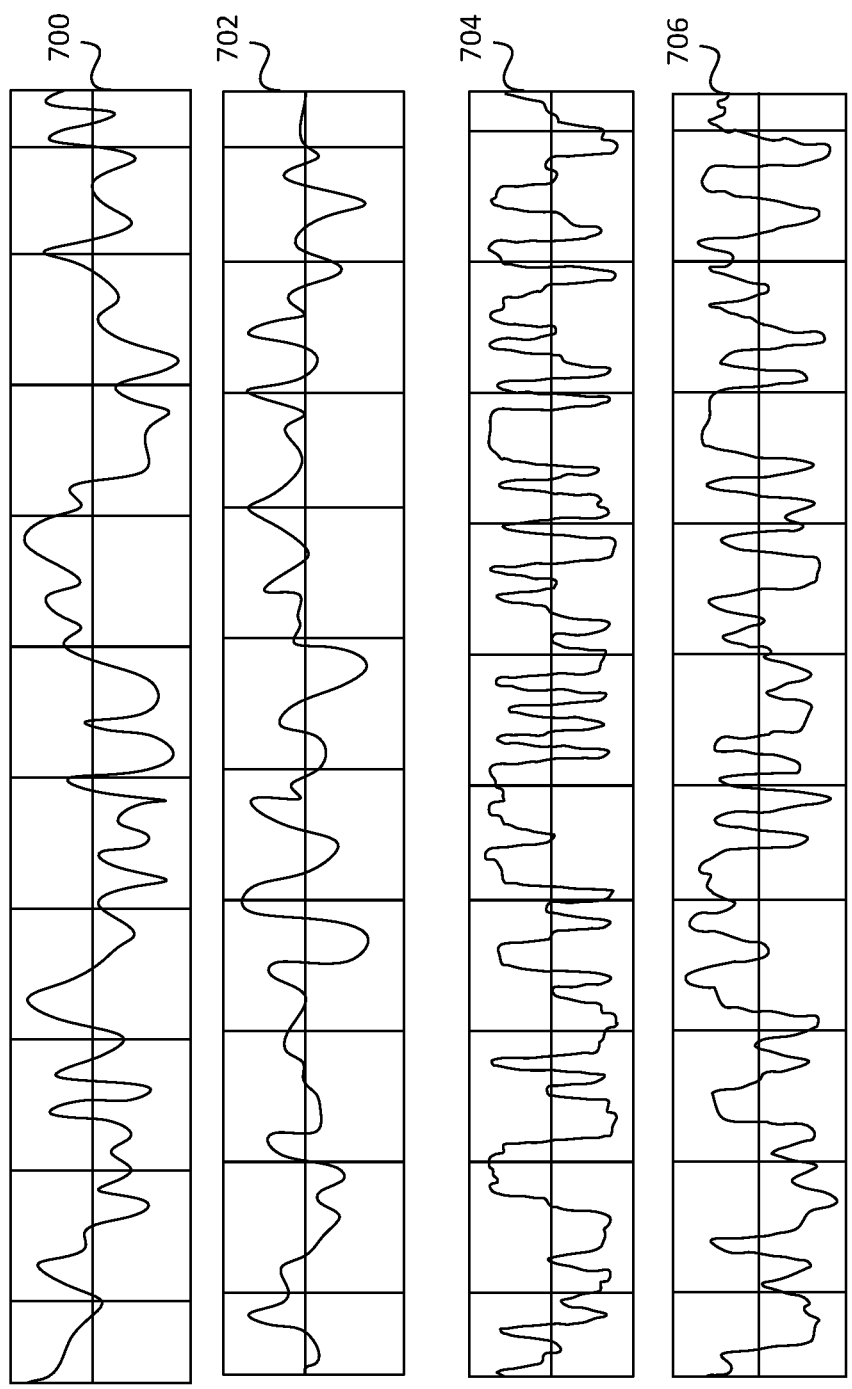
FIG. 7 illustrates example plots for extracted signals from a communication link between two devices.

FIG. 7 illustrates a number of plots with different waveforms. Plot 700 illustrates a superimposed voltage waveform $V_{TxRx}$ and plot 702 illustrates a superimposed current waveform $I_{TxRx}$. Using the embodiments discussed above, plot 704 illustrates an example of an extracted $V_{Tx}$ waveform from the superimposed voltage waveform of plot 700. And plot 706 illustrates an example of an extracted $V_{Rx}$ waveform from the superimposed voltage waveform of plot 700. These waveforms in plots 704 and 706 may then be used for further processing, such as generating eye diagrams.

With reference back to FIGS. 4 and 5, the test monitor 420 includes, as described above, one or more front ends 421, 422, 423. Any number of front ends may be present in the test monitor 420. When the voltage probe 412 and current probes 414 or 416 send their signals to the front end, such as the CH1 probe front end 421, the signals are fed to a pre-amplifier 424 which amplifies the signals. After the one or more processors 430 determines the data signal collected from the transmission lines 406, 408, the data signal is converted from an analog signal to digital data using an Analog to Digital Converter (ADC) 426. Voltage data and current data may be separated by the one or more processors and control logic 430. The contents of the digital data reflect the data collected from the transmission lines 406, 408 being sent between the ECUs 402, 404. If the data is from Ethernet packets, the payload contained in one or more Ethernet packets may be separated from header or other information from the Ethernet packets. The payload information stores application-based information. Next, the relevant data is collected in a memory 428, and a copy stored in data storage 432. This process repeats periodically as the network operates, so that the data collected from the transmission lines 406, 408 from the separate nodes is separated, decoded, and ultimately stored in the data storage 432, providing a complete, stored, record of the data sent between the ECUs 402, 404 in a method that does not negatively affect the transmission of any data across the transmission lines 406, 408. The collected data may be analyzed to view how data is synchronized across the data network. Further, data collected and analyzed according to embodiments of the invention may be used to measure wake-up and shutdown times of an automobile network. Data may be collected in the data storage 432 for as long as desired. Further, the one or more processors or other control logic 430 may be used to perform analysis on the data, as described below. Data may also be presented to a user on a screen and displayed as a protocol window output from the test monitor 420. In some embodiments, the test monitor 420 collects and stores gigabytes or terabytes per operational hour, or more.

In some embodiments the test monitor 420 may be produced using a programmed or configured FPGA (Field Programmable Gate Array). In other embodiments the test monitor 420 may be embodied in one or more programmed general or special-purpose processors. The test monitor 420 may include various memories or memory functions to store operations for operating the one or more processors 430 and control logic to perform the desired functions described herein.

Figure 8:
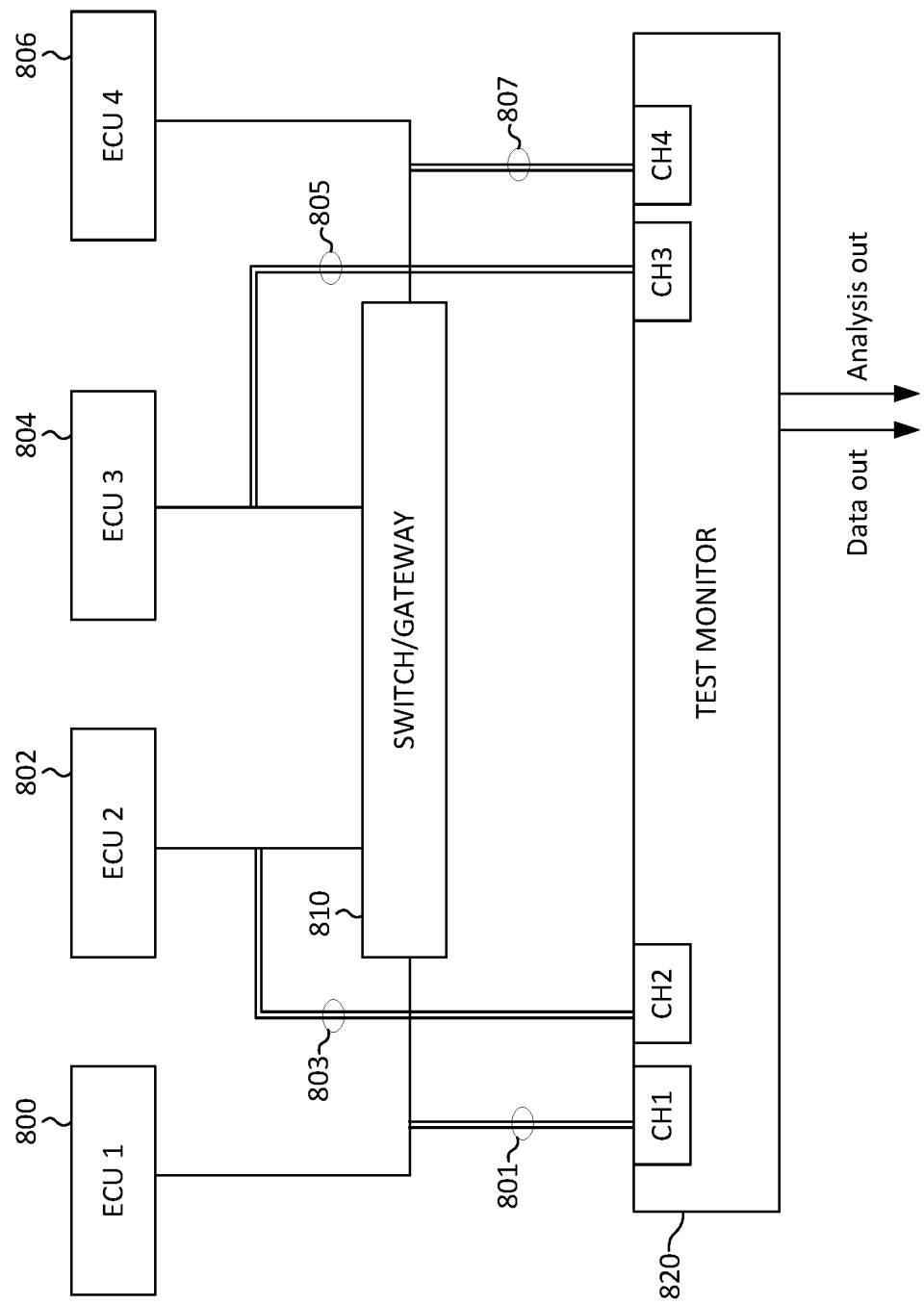
FIG. 8 is an example network diagram illustrating how embodiments of the invention may be used to simultaneously monitor several links of a communication network, according to embodiments of the invention.

Although the above description was given with respect to the test monitor 420 monitoring and generating data from a single data channel, i.e., from a single communication channel between two ECUs, embodiments of the invention may be used to monitor and collect data from any number of channels. FIG. 8 illustrates a test monitor 820, which may be an embodiment of the test monitor 420 described above, coupled to four test channels. Specifically, four ECUs 800, 802, 804, and 806 are coupled to a switch or gateway 810, such as a car Ethernet switch in a modern automobile information network. The test monitor 810, which in this example includes hardware for sampling four discrete channels, is coupled to each communication line between a respective ECU 800, 802, 804, 806 and the switch 810. Specifically, a sampling pair of lines 801 includes a line that samples voltage and a line that samples current between the ECU 1 800 and the switch 810, as described above. The sampling line pairs 803, 805, and 807 are similarly and respectively coupled to monitor data between the switch 810 and the ECUS 802, 804, and 806. In operation, each of the four data channels of the test monitor 820 generates its own data stream, and collects the data in a data store. The test monitor 820 may have a separate data store for each channel, or the test monitor 820 may identify which data came from which channel by adding a channel identifier to the data. The test monitor 820 may also time stamp when each set of data is collected by the test monitor 820.

The test monitor 820 may compare data collected from one channel to data collected on another channel. In car networks, oftentimes data is forwarded or appears on two or more channels after a delay. For example placing a modern car in reverse gear may cause a passenger side mirror to automatically angle downward, to assist the driver in reversing. In such a scenario, the test monitor 820 may be able to determine, by analyzing the stored data, that an indication of the car being placed in reverse gear is sent or forwarded from the powertrain ECU to a chassis ECU, which control the mirror operation. Then, the chassis ECU may generate a data signal to cause a servo motor in the mirror unit to move downward, in response. Using embodiments of the invention, the test monitor 820 may measure a time delay between the powertrain ECU and the mirror being moved by analyzing the data sent on one or more channels between the various connected ECUs and comparing the timestamps of the data.

Figure 9:
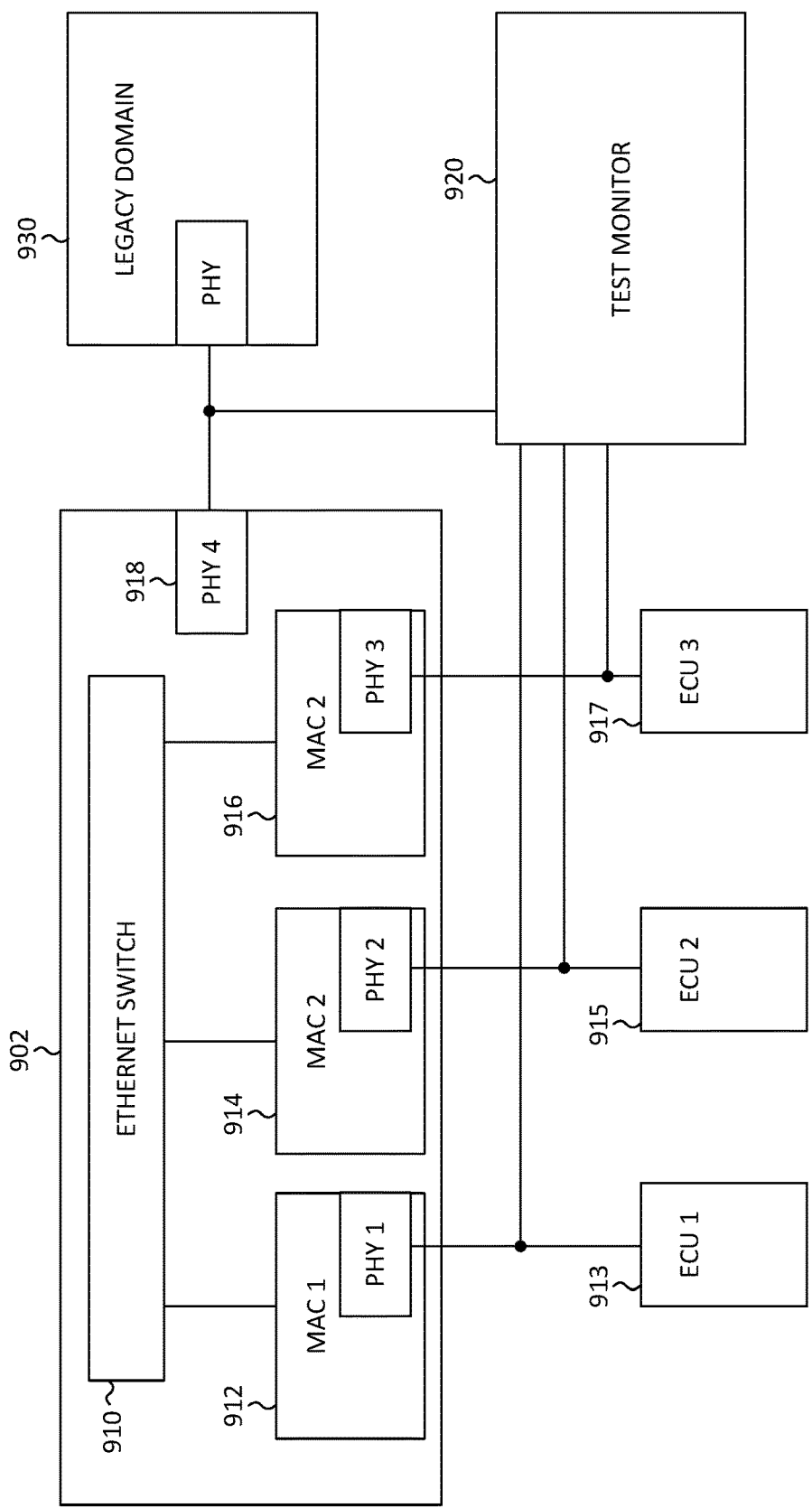
FIG. 9 is a block diagram illustrating how embodiments of the invention may be used to monitor a network including modern as well as legacy domains, according to embodiments of the invention.

FIG. 9 illustrates another example automobile information network including an Ethernet switch 910 in a modern domain 902 coupled to a legacy domain 930, such as a CAN or LIN described above. In this embodiment, the Ethernet switch 910 of the modern domain 902 includes three MACs (Medium Access Control Layers) 912, 914, 916, each including a PHY, which represents the physical hardware connection between each MAC and its associated ECU. In this example, MAC 912 is coupled to ECU 1 913, MAC 914 is coupled to ECU 2 915, and MAC 916 is coupled to ECU 3 917. As described above, a test monitor 920, which may be an example of the test monitor 420 of FIG. 4, is coupled to each of the communication lines between each MAC and each ECU, and collects and stores the data communicated on such lines as separate data input streams within the test monitor 920. As mentioned above, the modern domain 902 is further connected to the legacy domain 930 through its own set of PHYs. The communication between the modern domain 902 is monitored and stored by the test monitor 920 as well.

In operation, messages are transacted between any of the ECUs to another domain controller through the Ethernet switch 910. The test monitor 920 captures data generated by, for example ECU 1 913 as it sends data to the Ethernet switch 910. Then, the test monitor 920 observes data traffic between the modern domain 902 and the legacy domain 930. If the modern domain 902 transmits the same or similar data from the ECU 1 913 to the legacy domain 930, the test monitor 920 may detect the data transfer by comparing the payload data. Further, by analyzing the data, as described above, the test monitor 920 can calculate a delay between the time the ECU 1 913 sent the data to the modern domain 902 and the time the same data was received by the legacy domain 930. Further, all of this data generated between the various domains is stored within the test monitor 920, or may be output to another device for data analysis.

Data collected by the test monitor 920 may include payload data, such as in payloads of Ethernet packets, or may include any type of information, such as source address, destination address, etc. Payload data is especially valuable to track on an automobile network as it propagates through the network, as the payload data is not likely to change much between the various domains. Then, the test monitor 920 can compare payload data acquired on one channel to payload data acquired on one of the other channels to determine if payload data is being propagated across the network, from one ECU to one or more other ECUs, or between other components of the automobile network.

Figure 10:
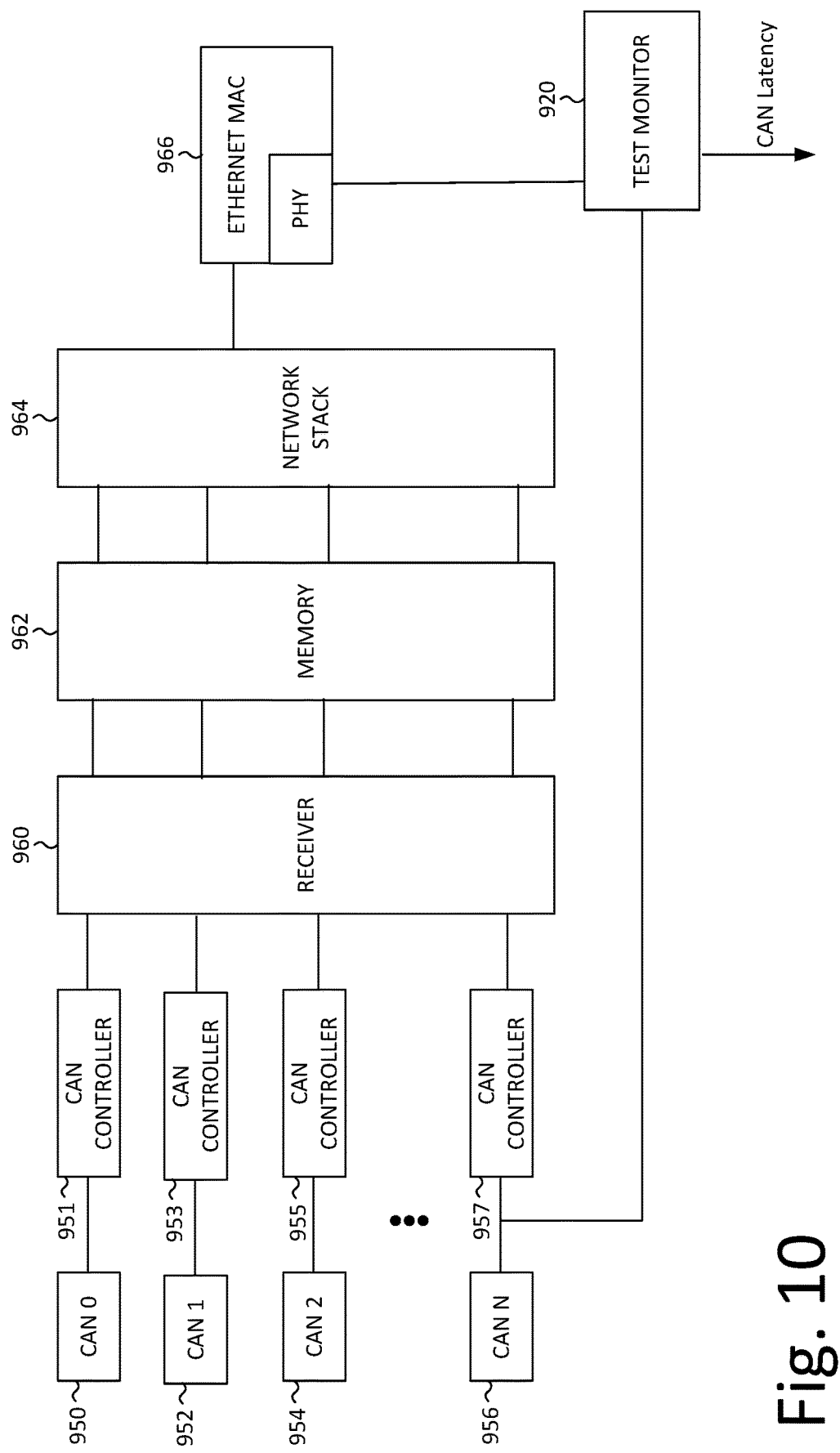
FIG. 10 is a block diagram illustrating how network delays may be determined, according to embodiments of the invention.

FIG. 10 illustrates that a similar concept works in reverse, as well, with a message generated by a CAN and propagated to an Ethernet network. For example, FIG. 10 illustrates a number of CANs, CAN 0 950, CAN 1 952, CAN 2 954, AND CAN N 956, each of which is coupled to a respective CAN controller 951, 953, 955, 957. An automobile network may include any number of CAN domains, as illustrated by the ellipsis. Messages generated from any of the CANs 950, 952, 954, 956 may be received by a receiver 960, stored as data in a memory 962, and put on a network stack 964, before being sent to an Ethernet MAC 966 to be sent over an Ethernet network as data from the related PHY. In some embodiments, the receiver 960, memory 962, and network stack 964 may all be components of an Ethernet network switch or Ethernet network domain.

After a frame is generated by a CAN, for instance CAN N 956, it is sent to the CAN controller 957, which, in some embodiments, generates an interrupt to be generated by a gateway processor (not illustrated). The processor then reads the frame from the memory CAN controller 957, receives it in the receiver 960, and stores it in the memory 962. When the signal from the CAN N is ready to be processed, the data from the memory 962, which may now be in a memory queue, is passed to the software network stack 964. This generates one or more data packets that are passed to a transmit que of the Ethernet controller, represented by the Ethernet MAC 966. The complete process takes some time, which is referred to as CAN to Ethernet latency. By monitoring the data channels between the CAN N 956 and the CAN controller 957, as well as monitoring the traffic generated at the Ethernet MAC 966, embodiments of the invention compare the monitored traffic, and their respective time stamps. Then, by comparing the time stamps, the test monitor 920 can generate and output the CAN latency.

Embodiments of the invention allows data collection from any ECU or domain within any car network, either a modern Ethernet network or a legacy CAN or LIN network. Multiple channels of data may be collected, as described above, and may be analyzed by the test monitor 920 or downloaded from the test monitor 920 for later data analysis.

The test monitor 920 may be used to provide many features in testing or debugging networks, such as automobile networks. As described above, the test monitor 920 may operate as merely a data logger, logging all of the data carried on any portions of the network that are being monitored by the test monitor 920. The test monitor 920 includes multiple channels, so multiple portions of the network may be sampled and stored in real-time. Using multiple test monitors 920 increases the number of channels that may be simultaneously monitored. Comparing payloads or other information from the stored data to one another allows the test monitor 920 to determine network delays, such as delays from generating a message or signal in an ECU and when it is propagated elsewhere in the network. Embodiments of the invention provide a straightforward method of determining CAN delay, and other delays in the network. Also, particular tests or triggers may be stored in the test monitor 920 to generate a signal when a particular signal is sent from an ECU, such as a signal indicating that anti-lock brakes have been initiated.

By analyzing data collected by the test monitor, data values may be analyzed to ensure data integrity between disparate domains. This data may be analyzed in real-time or may be analyzed at a later time. The stored data may be offloaded to another device or network for analysis. Using embodiments of the invention, it is possible to determine and debug if, for example, a particular ECU generates a data message and the message gets modified or corrupted by other hardware or software operating on the network. Data gathered by the test monitor 420 may be collected and offloaded to other devices or to an information cloud to be stored on a virtual network, such as a network accessible by the Internet or by private networks. In addition, data may be presented to a user, either in real-time or delayed time, through one or more protocol windows. By being able to collect massive amounts of data, embodiments of the invention are able to capture data events that occur infrequently. And, by storing all of the collected data, the data events may be studied or analyzed at a later time or date.

Aspects of the disclosure may operate on particularly created hardware, firmware, digital signal processors, or on a specially programmed computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a computer readable storage medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

EXAMPLES

Illustrative examples of the technologies disclosed herein are provided below. An embodiment of the technologies may include any one or more, and any combination of, the examples described below.

Example 1 is a test monitor for a network including a differential transmission line, including a first input configured to receive a voltage waveform from a voltage probe electrically coupled to the differential transmission line that electrically connects a first ECU device and a second device, a second input configured to receive a current waveform from a current probe electrically coupled to the differential transmission line, one or more processors configured to receive the voltage waveform and the current waveform and determine a voltage of the first ECU device and a voltage of the second device based on the voltage waveform and the current waveform, the one or more processors further configured to store data represented by the voltage of the first ECU device as first stored data and a voltage of the second device as second stored data, a memory for storing the first stored data and the second stored data.

Example 2 is a test monitor according to Example 1, in which the one or more processors are further configured to determine the voltage of the first device and the voltage of the second device based on an impedance of the differential transmission line.

Example 3 is a test monitor according to any of the above Examples, in which the one or more processors are further configured to determine the voltage of the first device using the following equation: $V_{Tx}=(V_{TxRx}-I_{TxRx}*Z)\div 2$, where $V_{Tx}$ is the voltage of the first device, $V_{TxRx}$ is the voltage waveform of the transmission line, $I_{TxRx}$ is the current waveform of the differential transmission line, and Z is an impedance of the differential transmission line.

Example 4 is a test monitor according to any of the above Examples, in which the one or more processors are further configured to determine the voltage of the second device using the following equation: $V_{Rx}=(V_{TxRx}-I_{TxRx}*Z)\div 2$, where $V_{Rx}$ is the voltage of the second device, $V_{TxRx}$ is the voltage waveform of the transmission line, $I_{TxRx}$ is the current waveform of the differential transmission line, and Z is an impedance of the differential transmission line.

Example 5 is a test monitor according to any of the above Examples, in which the one or more processors are further configured to determine the voltage of the first device using the following equation: $V_{Tx}=(V_{TxRx}+I_{TxRx}*Z\div 2)\div 2$, where $V_{Tx}$ is the voltage of the first device, $V_{TxRx}$ is the voltage waveform of the transmission line, $I_{TxRx}$ is the current waveform of the differential transmission line, and Z is an impedance of the differential transmission line.

Example 6 is a test monitor according to any of the above Examples, in which the differential transmission line is a full-duplex serial communication line on a co-axial cable in an automobile network.

Example 7 is a test monitor according to any of the above Examples, in which the first input and the second input comprise a first channel, the test monitor further comprising a second channel including a third input configured to receive a second voltage waveform from a second voltage probe electrically coupled to a second differential transmission line that electrically connects a second ECU device and a fourth device, a fourth input configured to receive a second current waveform from a second current probe electrically coupled to the second differential transmission line, the one or more processors configured to receive the second voltage waveform and the second current waveform and determine a voltage of the second ECU device and a voltage of the fourth device based on the second voltage waveform and the second current waveform, the one or more processers further configured to store data represented by the voltage of the second ECU device as third stored data and a voltage of the fourth device as fourth stored data, and the memory for storing the third stored data and the fourth stored data.

Example 8 is a test monitor according to Example 7, further comprising a timing generator to store an indication of when the first stored data was stored, and when the third stored data was stored.

Example 9 is a test monitor according to Example 8, in which the one or more processors is configured to compare a time stamp of the first stored data to a time stamp of the third stored data to determine a delay time.

Example 10 is a test monitor according to Examples 8 and 9, in which the one or more processors is configured to compare the first stored data to the third stored data to determine one or more data discrepancies.

Example 11 is a test monitor according to any of the above Examples, further comprising a facility to send the first stored data and the second stored data to a storage location separate from the test monitor as a storage file.

Example 12 is a test monitor according to any of the above Examples, in which the test monitor is embodied in a physical device that is removably coupled to the network through an electrical connector.

Example 13 is a test monitor according to Example 12, in which the physical device comprises an FPGA.

Example 14 is a test monitor according to any of the above Examples, in which the first ECU device and the second device are nodes of an automobile Ethernet network.

Example 15 is a test monitor according to Example 9, in which the first ECU device and the second device are nodes of an Ethernet automobile network, in which the second ECU device and the fourth device are nodes of a non-Ethernet automobile network coupled to the automobile Ethernet network, and in which comparing a time stamp of the first stored data to a time stamp of the third stored data determines a delay time between the automobile Ethernet network and the non-Ethernet automobile network.

Example 16 is a method for extracting a signal from a first ECU device and a second device on a transmission line connecting a first device and a second device, including receiving a voltage waveform including the signal from the first ECU device and the signal from the second device from a voltage probe electrically coupled to the transmission line, receiving a current waveform from a current probe electrically coupled to the transmission line, separating the signal of the first device and the signal of the second device from the voltage waveform based on the voltage waveform and the current waveform, decoding data sent from the first ECU device and sent from the second device from the voltage waveform and the current waveform, and storing the decoded data as first stored data.

Example 17 is a method according to Example method 16, in which separating the signal of the first ECU device and the signal of the second device from the voltage waveform includes separating the signal of the first device and the signal of the second device based on an impedance of the differential transmission line.

Example 18 is a method according to any of the above Example methods, in which separating the signal of the first device includes using the following equation: $V_{Tx}=(V_{TxRx}+I_{TxRx}*Z)\div 2$, where $V_{Tx}$ is the signal of the first device, $V_{TxRx}$ is the voltage waveform, $I_{TxRx}$ is the current waveform, and Z is an impedance of the transmission line.

Example 19 is a method according to any of the above Example methods, in which separating the signal of the first device includes using the following equation: $V_{Tx}=(V_{TxRx}+I_{TxRx}*Z\div 2)\div 2$, where $V_{Tx}$ is the signal of the first device, $V_{TxRx}$ is the voltage waveform, $I_{TxRx}$ is the current waveform, and Z is an impedance of the transmission line.

Example 20 is a method according to any of the above Example methods, in which the transmission line is a full-duplex serial communication line on a co-axial cable in an automobile network.

Example 21 is a method according to Example method 20, further including receiving a second voltage waveform including a signal from a second ECU device and a signal from a fourth device from a voltage probe electrically coupled to a second transmission line between the second ECU device and the fourth device, receiving a second current waveform from a second current probe electrically coupled to the second transmission line, separating the signal of the second ECU device and the signal of the fourth device from the second voltage waveform based on the second voltage waveform and the second current waveform, decoding data sent from the second ECU device and sent from the fourth device from the second voltage waveform and the second current waveform, and storing the decoded data as second stored data.

Example 22 is a method according to Example 21, further comprising comparing the second stored data to the first stored data.

Example 23 is a method according to Example 21, further comprising generating a first timestamp of the first stored data and a second timestamp of the second stored data, and comparing the first timestamp to the second timestamp.

Example 24 is a method according to any of the above Example methods, further comprising connecting the voltage probe to the transmission line through a separable electrical connector.

Example 25 is a method according to Example method 24, in which the voltage probe is coupled to a physical device comprising an FPGA.

Example 26 is a method according to any of the above Example methods, in which the first ECU device and the second device are nodes of an automobile Ethernet network.

Example 27 is a method according to Example method 23, in which the first ECU device and the second device are nodes of an Ethernet automobile network, in which the second ECU device and the fourth device are nodes of a non-Ethernet automobile network coupled to the automobile Ethernet network, and in which an output of comparing the first timestamp to the second timestamp determines a delay time between the automobile Ethernet network and the non-Ethernet automobile network.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the invention have been illustrated and described for purposes of illustration, it will be understood that various modifications may be made without departing from the spirit and scope of the invention. Accordingly, the invention should not be limited except as by the appended claims.

We claim:

1. A test monitor for a network including a differential transmission line, comprising:
   a first input configured to receive a voltage waveform from a voltage probe electrically coupled to the differential transmission line that electrically connects a first ECU device and a second device;
   a second input configured to receive a current waveform from a current probe electrically coupled to the differential transmission line;
   one or more processors configured to receive the voltage waveform and the current waveform and determine a voltage of the first ECU device and a voltage of the second device based on the voltage waveform and the current waveform, the one or more processors further configured to store data represented by the voltage of the first ECU device as first stored data and a voltage of the second device as second stored data; and
   a memory for storing the first stored data and the second stored data;
   in which the first input and the second input comprise a first channel, the test monitor further comprising a second channel including:
   a third input configured to receive a second voltage waveform from a second voltage probe electrically coupled to a second differential transmission line that electrically connects a second ECU device and a fourth device;
   a fourth input configured to receive a second current waveform from a second current probe electrically coupled to the second differential transmission line;
   the one or more processors configured to receive the second voltage waveform and the second current waveform and determine a voltage of the second ECU device and a voltage of the fourth device based on the second voltage waveform and the second current waveform, the one or more processors further configured to store data represented by the voltage of the second ECU device as third stored data and a voltage of the fourth device as fourth stored data; and
   the memory for storing the third stored data and the fourth stored data.

2. The test monitor of claim 1, further comprising a timing generator to store an indication of when the first stored data was stored, and when the third stored data was stored.

3. The test monitor of claim 2, in which the one or more processors is configured to compare a time stamp of the first stored data to a time stamp of the third stored data to determine a delay time.

4. The test monitor of claim 3, in which the first ECU device and the second device are nodes of an Ethernet automobile network, in which the second ECU device and the fourth device are nodes of a non-Ethernet automobile network coupled to the automobile Ethernet network, and in which comparing a time stamp of the first stored data to a time stamp of the third stored data determines a delay time between the automobile Ethernet network and the non-Ethernet automobile network.

5. The test monitor of claim 2, in which the one or more processors is configured to compare the first stored data to the third stored data to determine one or more data discrepancies.

6. The test monitor of claim 1, in which the test monitor is embodied in a physical device that is removably coupled to the network through an electrical connector.

7. The test monitor of claim 6, in which the physical device comprises an FPGA.

8. The test monitor of claim 1, in which the one or more processors are further configured to determine the voltage of the first device and the voltage of the second device based on an impedance of the differential transmission line.

9. The test monitor of claim 1, in which the one or more processors are further configured to determine the voltage of the first device using the following equation:

$$V_{Tx}=(V_{TxRx}+I_{TxRx}*Z) \div 2,$$

where $V_{Tx}$ is the voltage of the first device, $V_{TxRx}$ is the voltage waveform of the transmission line, $I_{TxRx}$ is the current waveform of the differential transmission line, and Z is an impedance of the differential transmission line.

10. The test monitor of claim 1, in which the one or more processors are further configured to determine the voltage of the second device using the following equation:

$$V_{Rx}=(V_{TxRx}-I_{TxRx}*Z) \div 2,$$

where $V_{Rx}$ is the voltage of the second device, $V_{TxRx}$ is the voltage waveform of the transmission line, $I_{TxRx}$ is the current waveform of the differential transmission line, and Z is an impedance of the differential transmission line.

11. The test monitor of claim 1, in which the current probe is electrically coupled to both lines of the differential transmission line, and in which the one or more processors are further configured to determine the voltage of the first device using the following equation:

$$V_{Tx}=(V_{TxRx}+I_{TxRx}*Z \div 2) \div 2,$$

where $V_{Tx}$ is the voltage of the first device, $V_{TxRx}$ is the voltage waveform of the transmission line, $I_{TxRx}$ is the current waveform of the differential transmission line, and Z is an impedance of the differential transmission line.

12. The test monitor of claim 1, in which the differential transmission line is a full-duplex serial communication line on a co-axial cable in an automobile network.

13. The test monitor of claim 1, further comprising a facility to send the first stored data and the second stored data to a storage location separate from the test monitor as a storage file.

14. The test monitor of claim 1, in which the first ECU device and the second device are nodes of an automobile Ethernet network.

* * * * *